(12) United States Patent
Udagawa et al.

(10) Patent No.: US 12,016,455 B2
(45) Date of Patent: Jun. 25, 2024

(54) WORK SURFACE HEIGHT ADJUSTMENT STOP APPARATUS AND METHOD OF UTILIZING SAME

(71) Applicant: Knoll, Inc., East Greenville, PA (US)

(72) Inventors: Masamichi Udagawa, New York, NY (US); Sigrid Moeslinger, New York, NY (US); Matthew Renninger, East Greenville, PA (US)

(73) Assignee: Knoll, Inc., East Greenville, PA (US)

( * ) Notice: Subject to any disclaimer, the term of this patent is extended or adjusted under 35 U.S.C. 154(b) by 447 days.

(21) Appl. No.: 17/350,716

(22) Filed: Jun. 17, 2021

(65) Prior Publication Data

US 2021/0393027 A1 Dec. 23, 2021

Related U.S. Application Data

(60) Provisional application No. 63/041,152, filed on Jun. 19, 2020.

(51) Int. Cl.
*A47B 21/06* (2006.01)
*A47B 9/20* (2006.01)

(52) U.S. Cl.
CPC .............. *A47B 21/06* (2013.01); *A47B 9/20* (2013.01); *A47B 2021/066* (2013.01); *A47B 2200/0019* (2013.01)

(58) Field of Classification Search
CPC .............. A47B 21/06; A47B 2021/066; A47B 2200/0019
USPC ................. 108/147.11, 147.17, 153.1, 50.02
See application file for complete search history.

(56) References Cited

U.S. PATENT DOCUMENTS

| 2,821,450 | A | | 1/1958 | Knoll | |
|---|---|---|---|---|---|
| 3,250,584 | A | * | 5/1966 | Tassell | A47B 57/565 248/245 |
| 4,163,537 | A | * | 8/1979 | Mourgue | A47B 17/003 248/223.41 |
| 4,248,325 | A | | 2/1981 | Georgopoulos | |
| 4,325,597 | A | | 4/1982 | Morrison | |
| 4,382,642 | A | | 5/1983 | Burdick | |
| 4,546,889 | A | | 10/1985 | Schoumaker et al. | |
| 4,567,698 | A | | 2/1986 | Morrison | |
| 4,604,955 | A | | 8/1986 | Fleischer et al. | |
| 4,762,072 | A | * | 8/1988 | Boundy | A47B 21/06 108/50.02 |
| 5,086,597 | A | | 2/1992 | Kelley et al. | |
| 5,224,429 | A | | 7/1993 | Borgman et al. | |
| 5,287,909 | A | | 2/1994 | King et al. | |
| 5,309,686 | A | | 5/1994 | Underwood et al. | |
| 5,328,260 | A | | 7/1994 | Beirise | |
| 5,408,940 | A | | 4/1995 | Winchell | |

(Continued)

*Primary Examiner* — Jose V Chen
(74) *Attorney, Agent, or Firm* — Buchanan Ingersoll & Rooney PC

(57) ABSTRACT

An apparatus configured to provide a stop for a height adjustable work surface can be configured to provide a stop to help stop a work surface from moving lower than a pre-selected height position. Embodiments of the apparatus can be configured to protect items below the work surface from being contacted by the work surface. This can help avoid dislodging electrical plugs or damage being accidentally caused to plugs or other devices that may be positioned below the work surface and within the range of motion of the vertically adjustable work surface.

17 Claims, 8 Drawing Sheets

(56) References Cited

U.S. PATENT DOCUMENTS

| | | | |
|---|---|---|---|
| 5,544,593 A * | 8/1996 | Canfield | A47B 91/00 |
| | | | 312/196 |
| 5,562,052 A | 10/1996 | Glashouwer et al. | |
| 5,598,789 A | 2/1997 | Jonker | |
| 5,609,435 A * | 3/1997 | Nomura | F16B 7/0433 |
| | | | 403/294 |
| 5,647,650 A * | 7/1997 | Daugherty | A47B 67/04 |
| | | | 312/265.5 |
| 5,675,946 A | 10/1997 | Verbeek et al. | |
| 5,680,893 A | 10/1997 | Neer | |
| 5,706,739 A | 1/1998 | Shaheen et al. | |
| 5,715,760 A * | 2/1998 | Frascaroli | A47B 83/001 |
| | | | 312/265.5 |
| 5,715,761 A | 2/1998 | Frattini | |
| 5,881,979 A | 3/1999 | Rozier, Jr. et al. | |
| 5,906,420 A | 5/1999 | Rozier, Jr. et al. | |
| 5,941,182 A | 8/1999 | Greene | |
| 5,943,966 A | 8/1999 | Machado et al. | |
| 5,966,879 A | 10/1999 | Verbeek et al. | |
| 6,000,180 A | 12/1999 | Goodman et al. | |
| 6,002,613 A | 12/1999 | Cloud et al. | |
| 6,029,587 A | 2/2000 | Rozier, Jr. et al. | |
| 6,067,762 A | 5/2000 | Greer et al. | |
| D427,783 S | 7/2000 | Luedke | |
| 6,167,664 B1 | 1/2001 | Reuter et al. | |
| 6,267,064 B1 * | 7/2001 | Ostertag | A47B 13/021 |
| | | | 211/187 |
| 6,367,213 B1 | 4/2002 | Reuter et al. | |
| D457,359 S | 5/2002 | Chan | |
| 6,389,988 B1 | 5/2002 | Frattini | |
| D458,040 S | 6/2002 | Stannis et al. | |
| 6,484,647 B2 * | 11/2002 | Lininger, Jr. | A47B 83/001 |
| | | | 312/265.5 |
| 6,536,357 B1 | 3/2003 | Hiestand | |
| 6,546,880 B2 | 4/2003 | Agee | |
| 6,725,784 B2 * | 4/2004 | Crinion | A47B 87/002 |
| | | | 108/50.01 |
| 6,808,334 B2 * | 10/2004 | Nicoletti | F16B 7/0466 |
| | | | 403/169 |
| 6,896,028 B2 | 5/2005 | Brennan | |
| 6,990,909 B2 * | 1/2006 | Gosling | A47B 83/001 |
| | | | 312/196 |
| 7,310,918 B1 | 12/2007 | Reuter et al. | |
| 7,735,433 B1 * | 6/2010 | Albright | B01L 9/02 |
| | | | 108/50.01 |
| 7,789,025 B2 | 9/2010 | Michaud, II et al. | |
| 8,056,489 B2 | 11/2011 | Nielsen | |
| D653,862 S | 2/2012 | Hairston | |
| 8,132,371 B2 | 3/2012 | Golinski et al. | |
| 8,186,281 B2 * | 5/2012 | Bastian | A47B 83/001 |
| | | | 108/50.02 |
| 8,256,359 B1 | 9/2012 | Agee | |
| 8,347,796 B2 | 1/2013 | Udagawa et al. | |
| 8,365,798 B2 | 2/2013 | Feldpausch et al. | |
| 8,661,765 B2 * | 3/2014 | Schaefer | F24S 25/65 |
| | | | 52/239 |
| 8,667,909 B2 | 3/2014 | Ruzicka | |
| 9,185,973 B2 | 11/2015 | Udagawa et al. | |
| 9,265,340 B2 | 2/2016 | Krusin et al. | |
| 9,585,468 B2 | 3/2017 | Udagawa et al. | |
| 9,730,513 B2 | 8/2017 | Udagawa et al. | |
| D796,216 S | 9/2017 | Rockwell et al. | |
| D800,459 S | 10/2017 | Rockwell et al. | |
| 9,920,520 B2 | 3/2018 | Udagawa et al. | |
| 10,036,576 B1 * | 7/2018 | Robinson | F24S 25/13 |
| 10,258,157 B2 * | 4/2019 | Wayner | A47B 96/1441 |
| 10,390,611 B2 | 8/2019 | Lee | |
| 10,413,063 B2 | 9/2019 | Lee | |
| 11,549,537 B2 * | 1/2023 | Udagawa | F16B 7/0433 |
| 11,713,574 B2 * | 8/2023 | Lukito | E04C 3/04 |
| | | | 52/836 |
| 11,744,361 B2 * | 9/2023 | Anderson | A47B 21/06 |
| | | | 108/50.02 |
| 2009/0273260 A1 * | 11/2009 | Kemp | A47B 21/06 |
| | | | 108/50.02 |
| 2010/0024687 A1 * | 2/2010 | Preiss | A47B 21/06 |
| | | | 108/50.02 |
| 2012/0126072 A1 | 5/2012 | Pettersson | |
| 2012/0304441 A1 | 12/2012 | Henriott | |
| 2013/0204438 A1 | 8/2013 | Hjelm | |
| 2017/0226749 A1 | 8/2017 | Fjetland | |
| 2019/0365089 A1 | 12/2019 | Lee | |
| 2021/0396258 A1 * | 12/2021 | Udagawa | F16B 7/22 |

* cited by examiner

WORK SURFACE HEIGHT ADJUSTMENT STOP APPARATUS AND METHOD OF UTILIZING SAME

CROSS-REFERENCE TO RELATED APPLICATIONS

The present application claims priority to U.S. Provisional Patent Application No. 63/041,152, filed on Jun. 19, 2020. The entirety of this provisional patent application is incorporated by reference herein.

FIELD

The present innovation relates to work surface (e.g. desktop, tabletop, or countertop, etc.) height adjustment of a work surface, and methods and mechanisms used to provide a stop for a height adjustable work surface of an articular of furniture (e.g. a desktop of a desk, a countertop of a counter, or a tabletop of a table etc.) to help ensure the work surface stops before it can affect other items positioned below the work surface.

BACKGROUND

Examples of tables and table arrangements can be appreciated from U.S. Patent Application Publication Nos. 2019/0365089, 2013/0204438 and 2012/0126072 and U.S. Pat. Nos. 10,413,063, 10,390,611, 9,585,468, 9,265,340, 8,667,909, 8,256,359, 8,056,489, 6,546,880, 6,536,357, 6,389,988, 6,029,587, 5,941,182, 5,881,979, 5,715,761, 5,706,739, 5,598,789, 5,562,052, 5,224,429, 5,408,940, and 4,604,955. Examples of other types of articles of furniture can be appreciated from U.S. Pat. Nos. 9,920,520, 8,365,798, 7,789,025, 7,310,918, 6,896,028, 6,367,213, 6,002,613, 6,000,180, 5,966,879, 5,675,946, 5,680,893, 5,287,909, 4,325,597, 4,248,325, and 2,821,450, U.S. Design Pat. Nos. D800,459, D796,216, D653,862, D458,040, D457,359, and D427,783 and U.S. Patent Application Publication Nos. 2017/0226749 and 2012/0304441.

Height adjustable desks, tables, and countertops are often positioned adjacent to other structures, such as cubicle partitions or privacy screens. The work surfaces of these articles of furniture can be configured so that one or more people can work at the work surface (e.g. use of a laptop, sitting at table for a meeting, standing at the table to work on a computer, etc.).

SUMMARY

We have determined that height adjustable work surfaces can pose an unanticipated hazard to items positioned below the work surface. For instance, work surfaces can be positioned to have a range of motion from a lowest position to a highest position that can allow the work surface to be moved into contact with items that may be positioned below the work surface when the work surface is in a higher position. For example, the work surface may be moved from a higher position to a lower position so a user can sit while working at the work surface and such motion can cause the work surface to contact and dislodge electrical wiring or other items that may be located below the work surface when the work surface is in its higher position. This type of contact can damage items below the work surface or otherwise cause unnecessary problems requiring the user to take corrective action (e.g. plug a power cord back into an outlet, readjust a light or other item that may have had a wire manipulated by the work surface during motion of the work surface, etc.). We have determined that a new apparatus is needed to help avoid such problems.

An apparatus can be configured to provide a stop for a height adjustable work surface. The apparatus can be configured to provide electrical wiring for power and/or telecommunication in addition to providing the stop functionality. The stop functionality may be provided in conjunction with a protective function that can help avoid dislodgement or damage to items connected to the apparatus (e.g. power cords, data cords, etc.). The apparatus can also be configure to provide other functions such as mounting of one or more privacy screens adjacent a work surface and providing seating adjacent the work surface. In some embodiments, the apparatus can be configured to be moveable to allow a work area to be easily readjusted in configuration (e.g. use of feet such as castors that permit rolling or glides that permit positioning of the apparatus on different sections of a floor). In other embodiments, the apparatus can be configured to be affixed to a floor so that the apparatus is not mobile when installed and in use.

Embodiments of an apparatus can be configured to provide a stop for a height adjustable work surface. Embodiments of the apparatus can include an elongated upper member having a top, a bottom, a first side extending between the top and the bottom and a second side extending between the top and the bottom opposite the first side. The first side can have a first side groove. The elongated upper member can be positionable remote from a work surface. Such positioning can locate the upper member adjacent to the work surface. The apparatus can also include a stop element attachable to the upper member via the first side groove so that the stop element extends below the work surface.

In some embodiments, the first side of the upper member can be a front or left side and the second side can be a rear or right side. The upper member can also have first and second ends. Each end can extend between the first side and the second side and also extend between the top and the bottom of the upper member.

The apparatus can also include at least one attachment mechanism that attaches the stop element to the upper member via the first side groove. The attachment mechanism can include a clip that extends from a body of the stop element to a position within the first side groove to engage the upper member within the first side groove. The attachment mechanism can also include at least one fastener that is passable through an attachment aperture defined in a lower portion of the body of the stop element for attaching an attachment portion of the clip to the body of the stop element or at least one fastener that is passable through an attachment nut positioned within the first side groove.

In some embodiments, the clip can include a distal hook portion and an intermediate portion between the attachment portion and the distal hook portion. The intermediate portion can extend through a clip passageway defined in the body of the stop element. The distal hook portion can be positioned in the first side groove to engage the upper member within the first side groove.

Embodiments of the apparatus can also include other features. For instance, embodiments can include at least one electrical outlet attached to the upper member below the first side groove. As another example, at least one skirt or a plurality of legs can be attachable to the upper member. As another example, a seat can be attached to the top of the upper member and/or a privacy screen body can be attached adjacent to a first end of the upper member via a privacy screen mounting device. As yet another example, the apparatus can include a plurality of legs attached to the upper member to support the upper member on a floor. The legs can be attached to feet (e.g. castors, glides, etc.). Each foot can be attached to a respective one of the plurality of legs.

The apparatus can include multiple stop elements. In such embodiments, there can be multiple stop elements positioned within the first side groove, for example. In other embodiments, a first stop element can be positioned in the first side groove of the first side of the upper member and a second side element can be positioned in a second side groove of a second side of the upper member. In some embodiments there can be a first stop element and a third stop element positioned in the first side groove and a second stop element and a fourth stop element positioned in the second side groove. In yet other embodiments, there can be more than two stop elements in each side groove on the opposite first and second sides of the upper member. In yet other embodiments, there may be only a single stop element positioned in the first side groove and only a single stop element positioned in the second side groove. In yet other embodiments, there may only be a single first sop element positioned in the first side groove. Each stop element can include a clip that extends from a body of the stop element to a position within the side groove to which it is positionable to engage the upper member within the side groove. Each stop element can also include at least one fastener that is passable through an attachment aperture defined in a lower portion of the body of the stop element for attaching an attachment portion of the clip to the body of the stop element and/or the upper member.

In some embodiments of the apparatus, the stop element can be positioned so that a distal end of the stop element is contactable with a work surface that is remote from the apparatus and is moveable from a position above the upper member to a position below the stop element so that the stop element prevents the work surface from moving below the stop element.

Embodiments of a method of providing a stop for a work surface are also provided. Embodiments of the method can include positioning an apparatus configured to provide a stop for a height adjustable work surface remote from an article of furniture having the work surface so that a stop element of the apparatus is positioned so that a distal end of the stop element is contactable with the work surface so that the stop element prevents the work surface from moving below the stop element. Embodiments of the method can utilize an embodiment of the apparatus discussed herein, for example.

In some embodiments of the method, the height adjustable work surface can be moveable from a first position that is above the stop element to a second position that is below the stop element and the stop element can be positioned to prevent the work surface from moving to the second position. For example, a work surface can be lowered from the first position and can contact the stop element before it reaches the second position to stop the work surface from being lowered to the second position.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of an apparatus configured to provide a stop for a height adjustable work surface are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Figure 1:
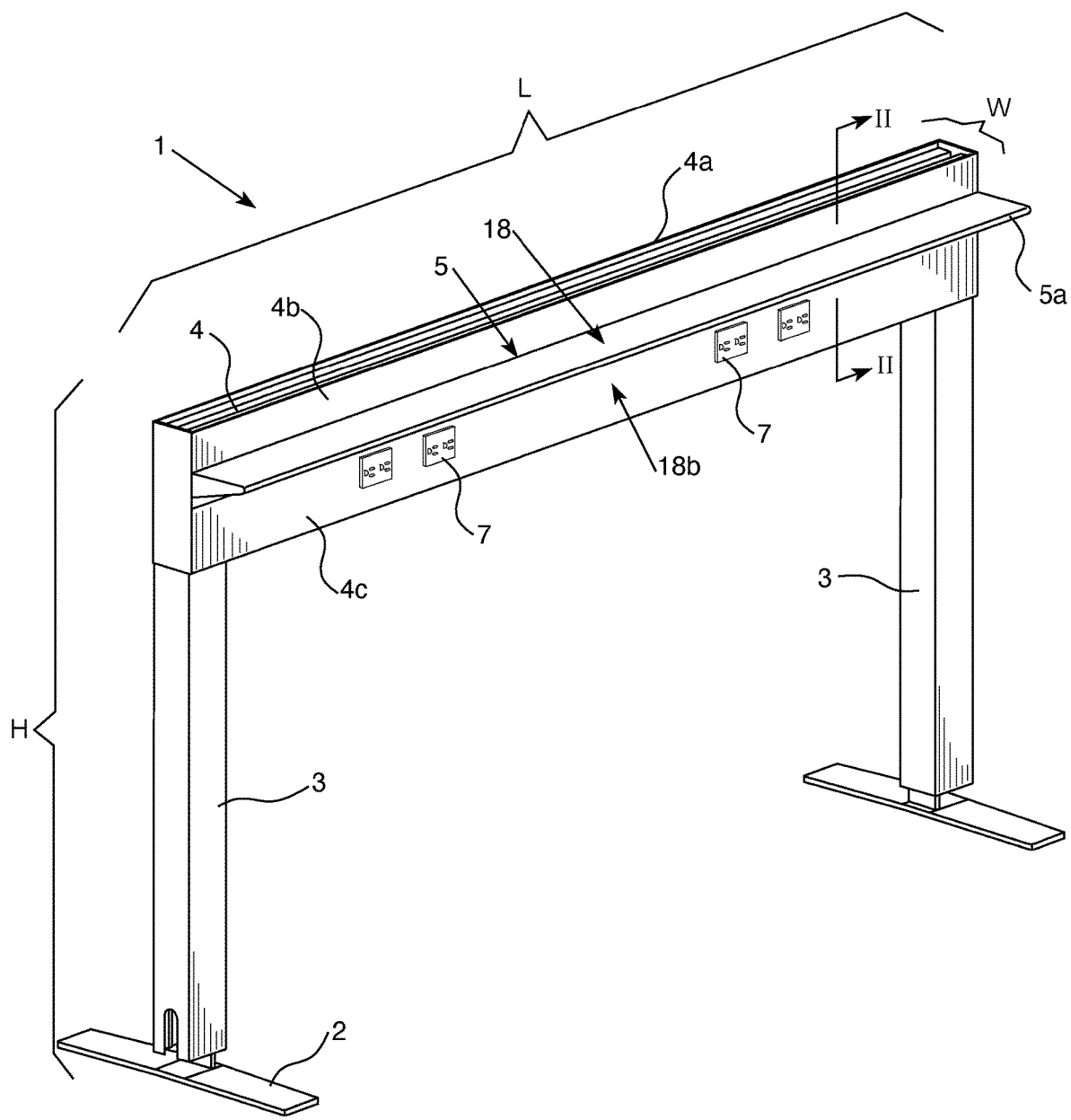
FIG. 1 is a perspective view of a first exemplary embodiment of an apparatus configured to provide a stop for a height adjustable work surface.
Figure 2:
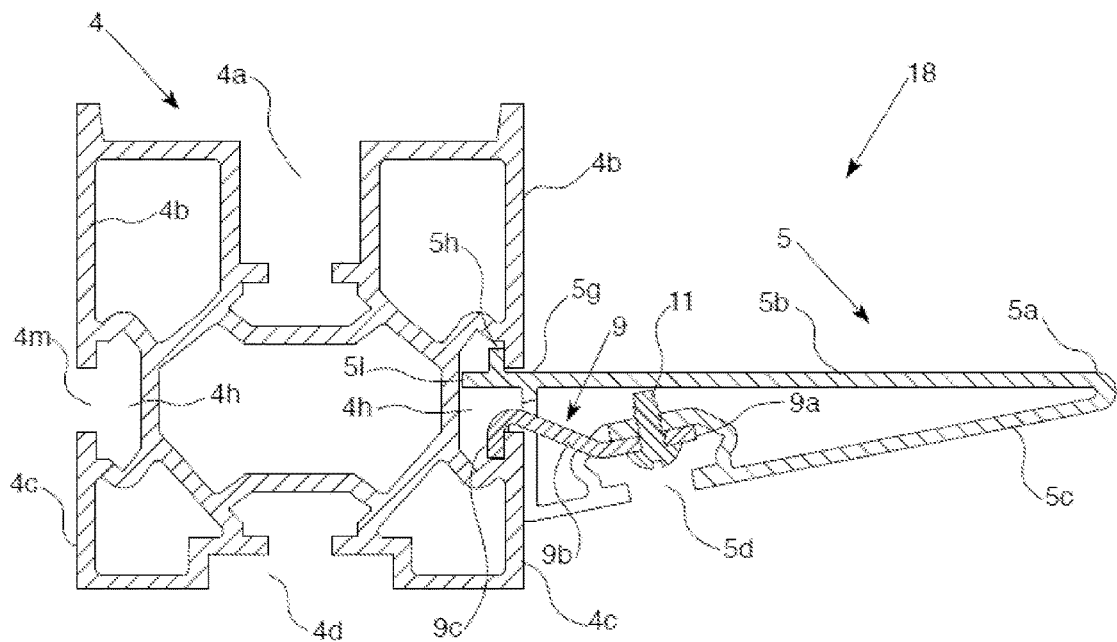
FIG. 2 is a cross-sectional view of the first exemplary embodiment of the apparatus configured to provide a stop for a height adjustable work surface taken along line II-II in FIG. 1.
Figure 3:
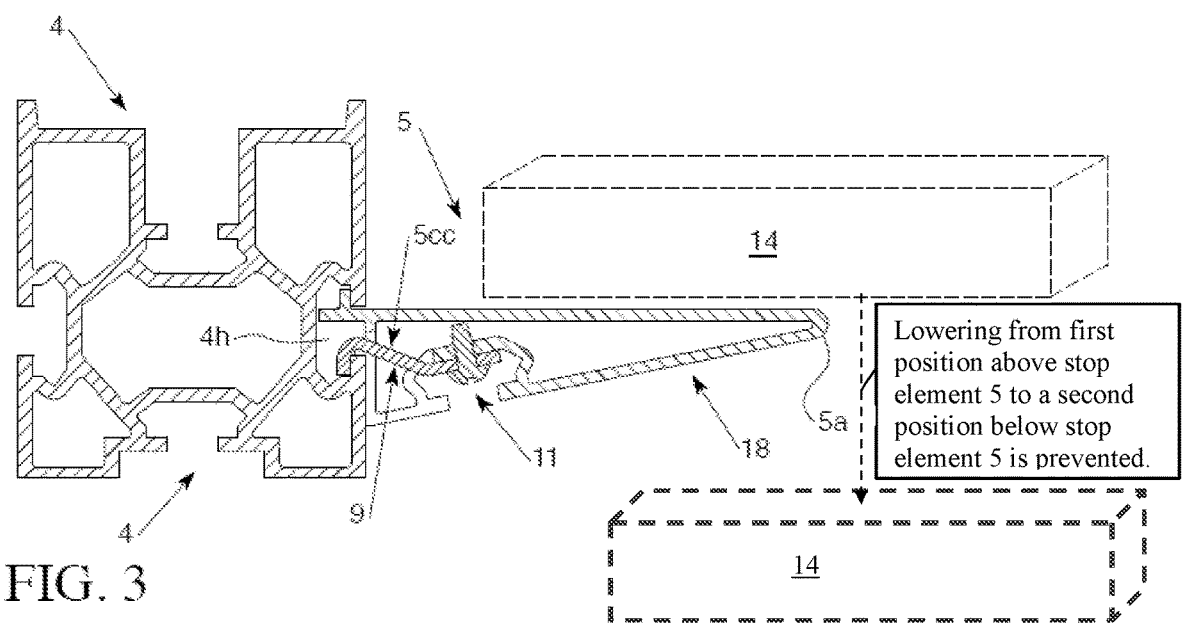
FIG. 3 is a view similar to FIG. 2 illustrating the work surface stop function of the stop element 5 of the first exemplary embodiment of the apparatus configured to provide a stop for a height adjustable work surface. The vertically adjustable work surface 14 positionable adjacent the stop element 5 is shown schematically in broken line in FIG. 3.
Figure 4:
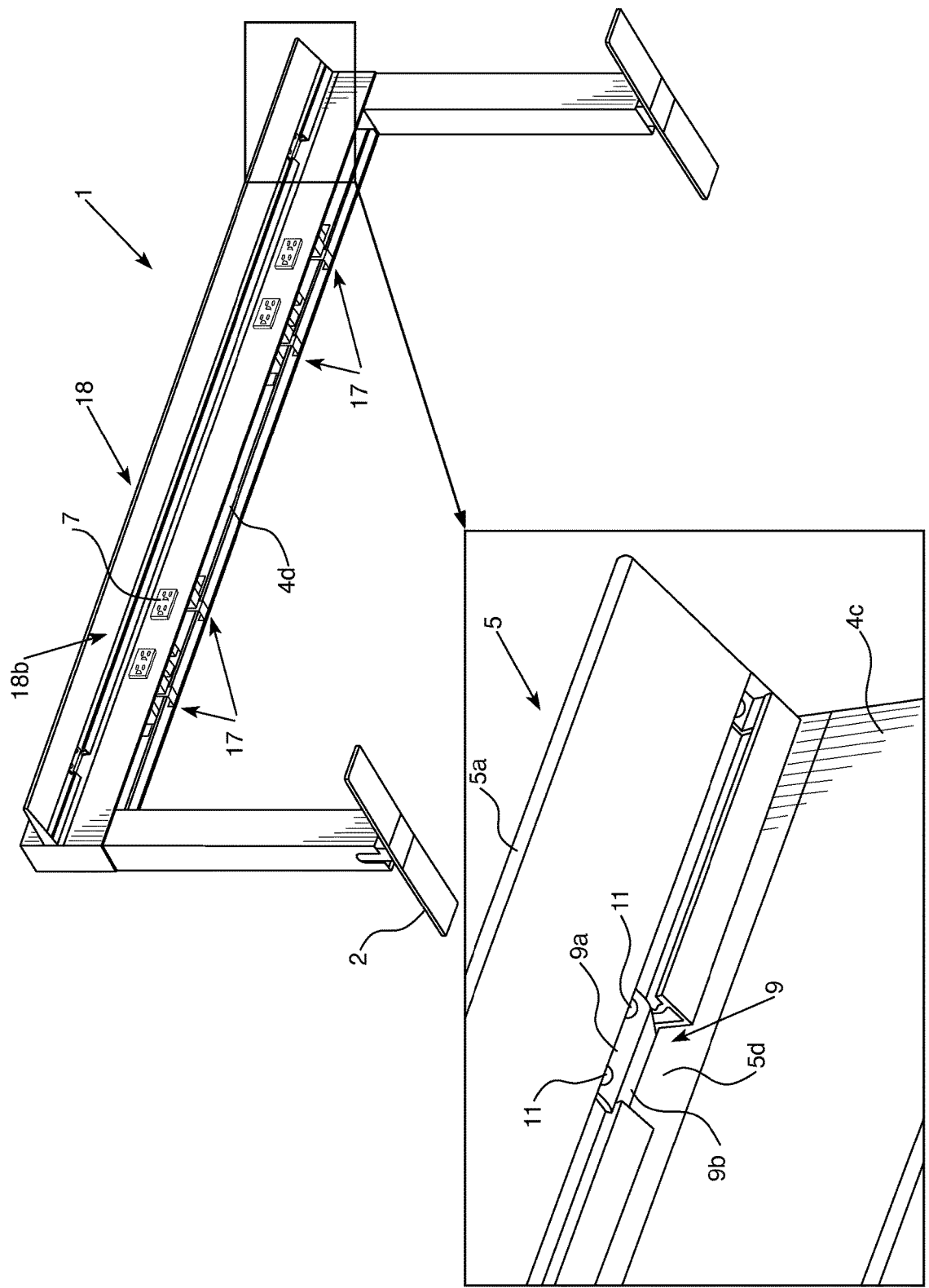
FIG. 4 is a perspective view of the first exemplary embodiment of an apparatus configured to provide a stop for a height adjustable work surface with an enlarged illustration of a portion of a stop element 5 of the apparatus.
Figure 5:
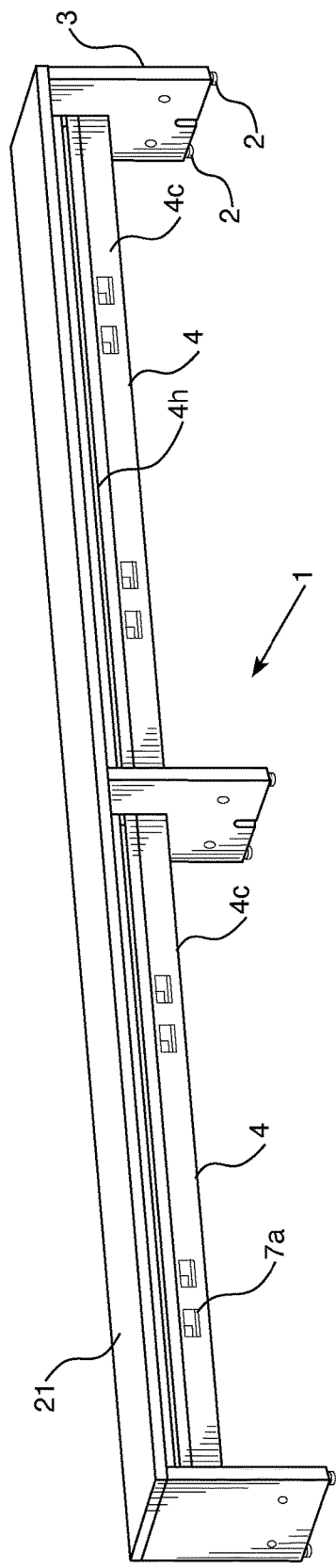
FIG. 5 is a perspective view of the first exemplary embodiment of an apparatus configured to provide a stop for a height adjustable work surface with power outlets 7 and a stop element 5 removed, feet 2 removed, and a seat element attached to the apparatus to provide seating.

Referring to FIGS. 1-11 an apparatus 1 configured to provide a stop for a height adjustable work surface can be positionable adjacent to a work surface 14 and be remote from the work surface (e.g. be a separate structure spaced apart from a table, desk, etc.). For example, the work surface 14 can be a tabletop or a desktop that is supported by legs or other work surface support structure and have a height adjustment mechanism that can lift and lower the vertical position of the work surface between a first position and a second position. The apparatus 1 configured to provide a stop for a height adjustable work surface can be a separate article of furniture that can be positioned adjacent to and spaced apart from the work surface below the work surface and near a peripheral edge of the work surface.

The apparatus 1 configured to provide a stop for a height adjustable work surface can include legs 3. In some embodiments, the bottom portion of each leg 3 can include a foot 2 (e.g. a castor, a glide, or other foot element) that is configured to contact a floor and help keep the leg balanced and supported on a floor. The foot 2 of each leg 3 can also permit the apparatus 1 to be mobile and allow the apparatus 1 to be easily moved to different positions on a floor by a user to allow for different work space arrangements in a work space (e.g. a room in an office, a floor of a building, multiple floors of a building that function as an office space, etc.) and to allow the changing of a workspace arrangement involving the apparatus 1 to occur relatively easily.

In other embodiments, the legs 3 can be configured to be installed to the floor so that they are affixed to the floor and provide a stable support for the body of the apparatus 1. For such embodiments, the legs 3 would need to be decoupled from the floor for moving the apparatus 1 to a new position in a work area (e.g. a room in an office, a floor of a building, multiple floors of a building that function as an office space, etc.).

The legs 3 can extend vertically to help define a height H of the apparatus 1. The legs 3 can support an upper member 4. The upper member 4 can be an elongated member (e.g. a beam, a rod, a beam assembly, an elongated structure extending above the legs and attached to the legs, etc.). The length of the upper member 4 can help define a length L of the apparatus 1. The height of the upper member 4 can help define a portion of the height H of the apparatus and the thickness of the upper member 4 can help define a width W of the apparatus 1.

The upper member 4 can have a top, a bottom, a first side extending between the top and bottom, a second side extending between the top and bottom that is opposite the first side, a first end at the first distal ends of the top, bottom, first side and second side, and a second end at the second distal ends of the top, bottom, first side and second side. In some embodiments the first and second ends can be considered the right and left sides of the apparatus 1 and the first and second sides can be considered the front and rear of the apparatus 1. In other embodiments, the first and second ends can be considered the front and rear of the apparatus 1 and the first and second sides can be considered the left and right sides of the apparatus 1.

The upper member 4 can have a number of apertures defined therein. For example, the upper member 4 can have an upper aperture 4a, side grooves 4h, and a bottom channel 4d. Each aperture can include a mouth 4m that is an outermost portion of the aperture that is at an interface of the aperture and the space adjacent a side of the upper member (e.g. the upper aperture has a top mouth 4m, the first and second side grooves 4h each have a mouth 4m at their outermost side portion of the groove, bottom channel 4d has a bottom mouth 4m at the bottom of the bottom channel 4d).

The side groove 4h of the upper member can include a first side groove 4h defined in the first side of the upper member 4 and a second side groove 4h defined in the second side of the upper member 4. The first side groove 4h can be defined so that there is an upper portion 4b of the first side that extends above the first side groove 4h to the top of the upper member and a lower portion 4c that extends below the first side groove 4h to the bottom of the upper member. The second side groove 4h can also be defined so that there is an upper portion 4b of the second side that extends above the second side groove 4h to the top of the upper member and a lower portion 4c that extends below the second side groove 4h to the bottom of the upper member.

The sides of the upper member 4 can include electrical outlet openings 7a for retaining electrical outlets 7 therein. The electrical outlet openings 7a be positioned in the first side of the upper member 4, the second side of the upper member 4, or can be positioned in the first and second sides of the upper member 4. The electrical outlet openings 7a can be positioned in the lower portion 4c below the side groove 4h for each side of the upper member so that the electrical outlets 7 can be positioned below the side groove 4h. The electrical outlet openings 7a can be in communication with one or more wiring conduits defined within the upper member 4 to facilitate the routing of electrical and/or data wiring through the upper member 4. This wiring (e.g. power cord, Ethernet cabling, etc.) can be connected to the electrical outlets 7 so that an electrical device can be plugged into the outlet 7 to receive power and/or data (e.g. via an Ethernet wiring). In some embodiments, the electrical outlets can include openings for prongs of a power plug in addition to at least one universal serial bus (USB) opening for at least one USB plug. The electrical outlets 7 can also, or alternatively, include at least one opening for a connection to an Ethernet wiring plug for providing a wired data connection to an electrical device (e.g. a laptop computer, a personal computer, etc.). In yet other embodiments, the outlets 7 may only have one or more USB openings with or without other openings for power and/or data connectors.

The upper aperture 4a of the upper member 4 can be configured to facilitate mounting of one or more structures. For example, the upper aperture 4a can be configured to facilitate attachment of a privacy screen to position the privacy screen above the upper member 4, a television or other type of display to support that display above the upper member 4, or a seat 21 that can be supported on the upper member 4 to provide seating above the electrical outlets 7. In some embodiments, the seat 21 can be an elongated seat 21 so that the seat 21 of the apparatus provides bench seating.

In yet other embodiments, the upper aperture 4a can be covered via a cover plate that may be attached to the top of the upper member 4 for covering the upper aperture 4a. It is also contemplated that some embodiments of the apparatus 1 may not utilize an upper aperture 4a.

Figure 11:
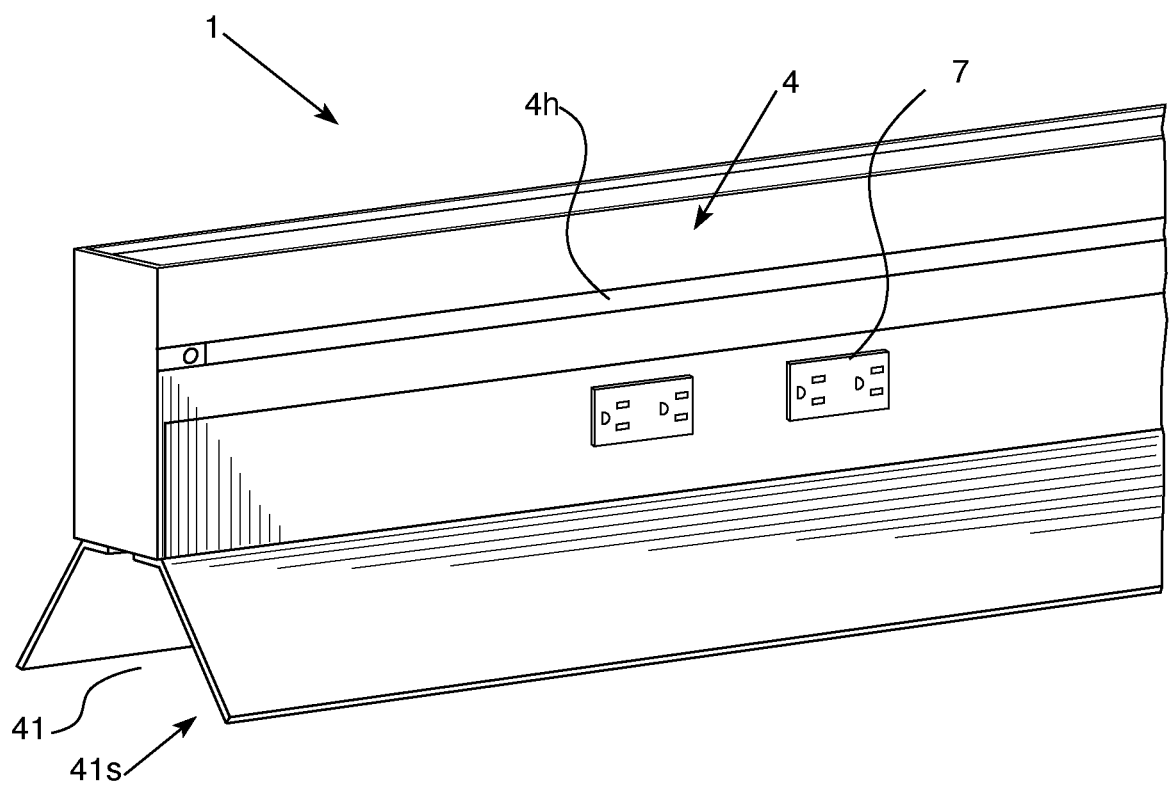
FIG. 11 is a fragmentary perspective view of the first exemplary embodiment of an apparatus configured to provide a stop for a height adjustable work surface having an exemplary skirt attached thereto.

The bottom channel 4d can be configured to facilitate attachment of one or more mounting devices 17 to the bottom portion of the upper member 4. The mounting devices 17 can be configured to help mount shelving, pouches, storage devices, or other structure to the upper member 4 so that these items are positioned above a floor and below the upper member 4. In some embodiments, the mounting devices 17 can be configured to attach a modesty screen 41s (which can also be referred to as a skirt) to the upper member 4 to provide a visible barrier below the upper member 4 and/or to define a passageway 41 along which power cords or extension cords may be passed to help hide the cords to provide an improved aesthetic effect while also functioning to prevent the cords from being a trip and fall hazard. An example of such a skirt or modesty screen 41s that provides such a cord hiding function is shown in FIG. 11. Such a configuration of the skirt or modesty screen 41s can be configured so that legs 3 are attached to the upper member via the mounting devices 17 so that the legs define the modesty screen 41s and the passageway 41.

One or more stop elements 5 can be attached to the upper member 4. Each stop element 5 can be positioned above one or more outlets 7 configured to power and/or data transmission. Each stop element 5 can include a distal edge 5a that is positioned away from the upper member 4 and can include an inner side 5g that is opposite its distal edge 5a. The inner side 5g of the stop element 5 can be sized and configured for attached to a side of the upper member via side groove 4h.

Each stop element 5 can include an upper side 5b that extends from the distal edge 5a to the inner side 5g to define a top surface of the stop element. Each stop element 5 can also include a lower side 5c that extends from the distal edge 5a to the upper member 4 to define a bottom surface of the stop element 5. The lower side 5c can also define an attachment aperture 5d therein to facilitate positioning of a fastener 11 and/or at least one attachment clip 9 for connection of the stop element 5 to the upper member 4 via the side grove 4h.

Figure 6:
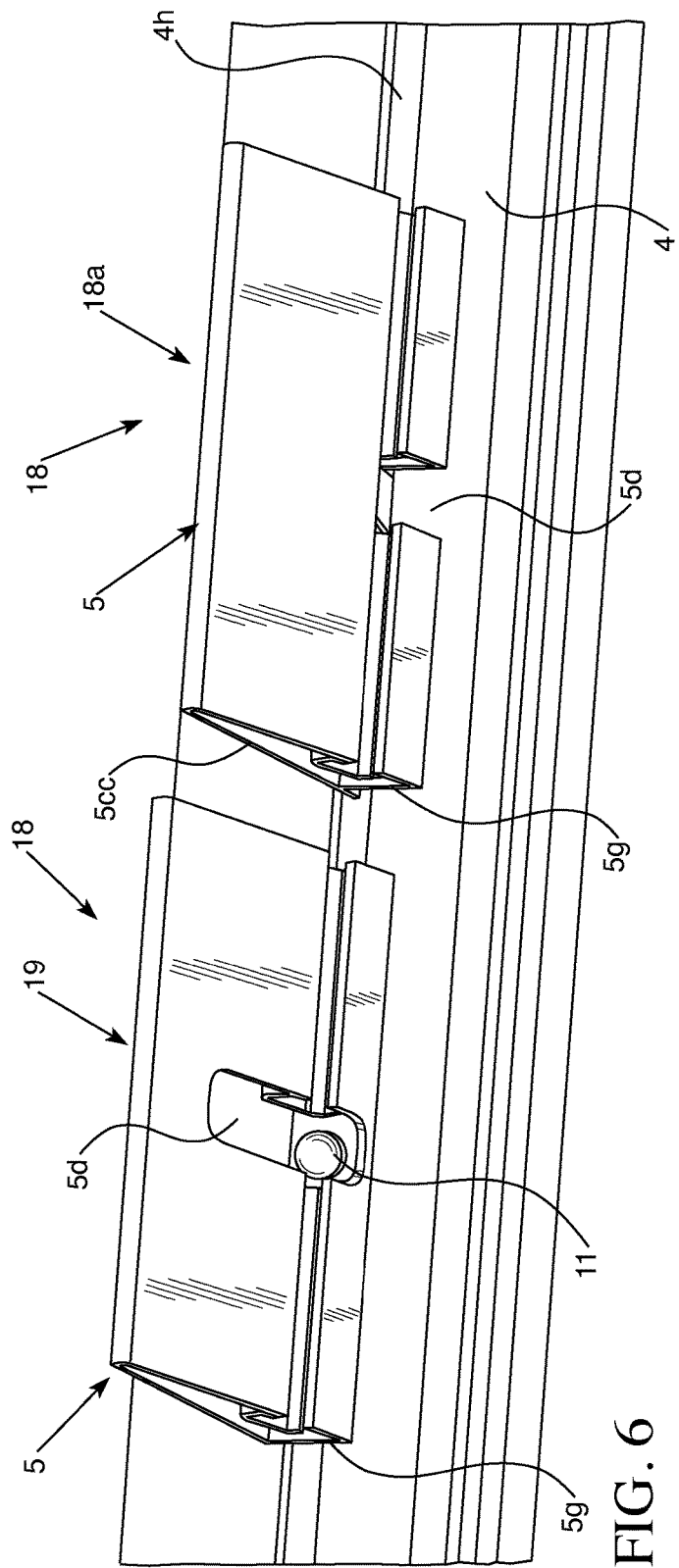
FIG. 6 is a fragmentary perspective view of the first exemplary embodiment of an apparatus configured to provide a stop for a height adjustable work surface having alternative stop elements 5 attached thereto.
Figure 7:
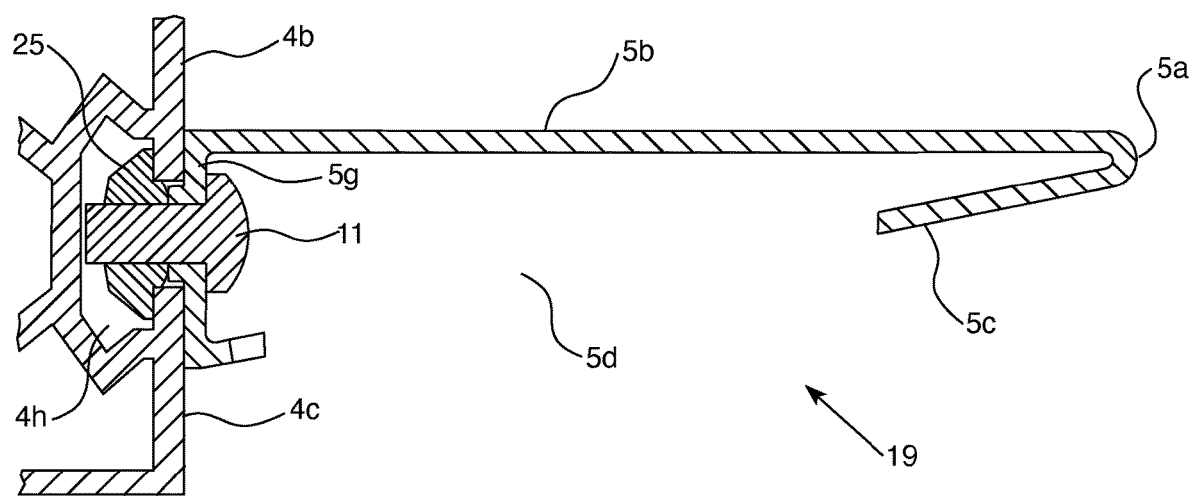
FIG. 7 is a cross-sectional view similar to FIG. 2 illustrating an exemplary embodiment of a stop element 5.

In some embodiments, each stop element 5 can have a triangular cross-sectional shape as may be appreciated from the exemplary embodiments shown in FIGS. 2, 3, 6, and 7. In other embodiments, the stop element 5 can have a different shape (e.g. polygonal cross-sectional shape, an oval cross-sectional shape, etc.). In some embodiments, the body 18 of the stop element 5 can be sized and configured to be elongated and extend along a significant portion of the Length L of the apparatus 1 or the length L of the upper member 4 (e.g. be about as long as the upper member 4 (e.g. a length that is +/−5-10% of the length of the upper member 4, be as long as the upper member 4, etc.). In other embodiments the stop element 5 can have a body configuration 18a or body configuration 19 that has a length that is a smaller portion of the length of the upper member 4 so that multiple stop elements 5 can be positioned within the same side groove 4 at spaced apparat locations along the length of a side of the upper member 4. FIG. 6 illustrates an example of such an arrangement. As may also best be appreciated from FIG. 6, there can be more than one type of stop element body structure utilized for attachment of stop elements 5 to one or both sides of the upper member 4. (e.g. stop element body configurations 18a and 19).

As may best be appreciated from FIGS. 2-4 and 7, the stop elements 5 can be configured for attachment to the upper member 4 via a side groove 4h and/or an attachment mechanism. The attachment mechanism can utilize one more fasteners 11 (e.g. screws or bolts, etc.) and may also utilize one or more attachment clips 9.

The inner side 5g of the stop element 5 can also be configured to facilitate attachment to the upper member 4 via a side groove 4h. The inner side 5g can be configured to engage the upper member 4 via the side groove 4h to prevent dislodgement from a force that may act downwardly on an upper surface of the body of the stop element 5.

The attachment aperture 5d can be positioned in a bottom surface or lower surface of the stop element 5 can be sized to facilitate a clip 9 and at least one fastener 11 to be positioned in the attachment aperture for attachment of the clip 9 to the stop element 5 via the one or more fasteners 11. The attachment aperture 5d can be in communication with a clip passageway 5cc defined in the body of the stop element 5 that is sized to permit a portion of the clip 9 to be positioned through the attachment aperture 5d and passed into the body of the stop element 5 and into the side groove 4h for engagement with the upper member 4 within the side groove 4 such that a distal hook portion 9c of the clip is within the side groove 4h for contacting and/or engaging the upper member therein. An attachment portion 9a of the clip can be within the attachment aperture 5d and can be in contact with and/or engagement with at least one fastener 11 for attachment of the clip 9 to the body of the stop element 5. An intermediate portion 9b of the clip 9 can extend from the attachment portion 9a to the distal hook portion 9c by extending through the clip passageway 5cc between these portions of the clip 9.

It should be appreciated that the hook portion 9c can be considered a first portion of the clip 9, the attachment portion 9a can be considered a second portion of the clip 9, and the intermediate portion 9b can be considered a third portion of the clip 9 in some embodiments. In some embodiments, the clip 9 can have a body that is shaped so that the attachment portion provides a flat surface for attachment via at least one fastener, the intermediate portion 9b extends linearly at an angle from the attachment portion 9a for passing through the clip passageway 5cc, and the hook portion 9c has a curved segment between the intermediate portion and its distal end to define a profile for engagement with the upper member 4 within the side groove 4h. At least a segment of the hook portion 9c can be configured to provide a surface that can mate with a portion of the upper member 4 within the side groove 4h to facilitate attachment of the stop element 5 to the upper member 4 via the side groove 4h. The distal hook portion 9c can be configured to engage (e.g. contact, interlock with, etc.) a portion of the upper member 4 to prevent a force that may act upwardly on a bottom surface or lower surface of the stop element 5 from dislodging the stop element 5 from the upper member 4.

The clip 9 can function to help support the stop element 5 in its position when attached to the upper member 4 and allow the positioning of the clip 9 and fastener(s) 11 to occur more easily as a user can pass the clip through the clip passageway 5cc to a desired position and then pass one or more fasteners through the attachment portion 9a for attachment of the clip to the stop element 5, which can also bring the hook portion 9c of the clip 9 into a tight contact with the side of the upper member 4 within the side groove 4h. In some embodiments, the hook portion 9c can extend downwardly from the side groove 4h to engage with the lower portion 4c of a side of the upper member 4 within the groove 4h.

The inner side 5g of the stop element 5 can also include a profile that is configured for positioning within an upper section of a side groove 4h defined in the upper member 4. For instance, the inner side 5g can include a horizontally extending portion 5i and a vertically extending portion 5h that are configured to be positioned in the side groove 4h so that the horizontally extending portion 5i is positioned near an inner portion of the upper member 4 that defines an inner side of the side groove 4h and the vertically extending portion 5i is positionable against a segment of the upper portion 4b of the side from within the side groove 4h above the mouth of the side groove 4h.

The inner side 5g of the stop element 5 can be utilized to help locate the stop element 5 within the side groove 4h and position the stop element 5 adjacent the upper member 4 as an initial attachment to the upper member 4. The clip 9 and at least one fastener 11 can then be inserted through the body of the stop element 5 within the attachment aperture 5d to help further secure the stop element 5 to the upper member. For instance, the clip 9 can be positioned through the clip passageway 5cc for positioning in a side groove 4h for engagement with the upper member 4 via its distal hook end portion 9c and then at least one fastener 11 can be positioned to attach the attachment portion 9a of the clip to the body of the stop element 5.

The distal hook end portion 9c of the clip 9 can be configured to engage the upper member 4 to avoid disconnection of the stop element 5. In some embodiments, the engagement can prevent a force from below the stop element 5 that may act upwardly on a bottom surface or lower surface of the stop element 5 from dislodging the stop element 5 from the upper member 4. Such a force could occur from a table that may be below the stop element 5 being raised and incidentally contacting a lower surface of the stop element 5 during the raising of the table.

If it becomes desired to remove the stop element 5, then a user can use a mechanical tool (e.g. a screwdriver, hex wrench, Allen wrench, etc.) to loosen the fastener(s) 11 to remove the fastener(s) 11 from the body of the stop element 5. The clip(s) 9 can then be manipulated to remove the clips 9 from the side groove 4h and clip passageway(s) 5cc. Thereafter, the stop element 5 can be manipulated so its inner side 5g is disengaged from the upper member 4 within side groove 4h for separation of the stop element from the upper member 4 for removal of the stop element 5.

Each stop element 5 can be reattached and again re-separated from an upper member 4 multiple times in repetitive cycles as may be needed to account for different uses of the apparatus 1 and different changes in furniture arrangements that may occur at a particular work area. The use of clips 9 and fasteners 11 can be designed to allow for such repetitive uses without damaging the upper member 4, stop elements 5, clips 9 or fasteners 11.

In some embodiments, it is contemplated that the clip 9 can be integral to the body of the stop element 5 such that one or more fasteners 11 are not needed for attachment of the clip 9 to the stop element 5. Such embodiments can be configured so that the distal end of the clip 9 is configured for a snap-like removable attachment to the upper member 4. Rotation of the stop element 5 can facilitate attachment of the clip 9 to the upper member so that the distal end of the clip can engage the upper member 4 to prevent dislodgement of the stop element 5 via a force that may act upwardly on a bottom surface of the stop element (e.g. via a table below the stop element being raised into contact with the stop element 5). The clip 9 can also be manipulated via resiliency of the clip 9 in conjunction with a user's movement of the body of the stop element 5 to facilitate disconnection of the stop element 5 from the upper member 4 or such embodiments. The snap-connection feature of the integral clip 9 can allow such an embodiment of the stop element to be connected and disconnected without use of a mechanical tool.

As may best be appreciated from FIGS. 1-4, when the stop element 5 is attached to the upper member 4, the stop element 5 can be positioned above one or more outlets 7 and extend away from the upper member 4 to its distal edge 5a to cover or shroud the outlet(s) 7 and any plug or other item coupled to the outlet(s) 7. This positioning of the one or more stop elements 5 can be protect the outlet(s) 7 and any plug or other item coupled to the outlet(s) 7 (e.g. USB plugs, power plugs, Ethernet cables, etc.). When a work surface 14 of a desk, table, or the like that may be remote from the apparatus 1 is near the apparatus 1, the stop element 5 can be positioned so that the top surface of the stop element 5 and/or distal edge 5a contact the work surface 14 if the work surface is attempted to be lowered below the stop element 5. Due to the connection the stop element 5 has to the upper member 4, this contact with the work surface 14 that is being lowered can function to stop further lowering of the work surface 14 and protect the items connected to the outlet(s) 7. This can avoid dislodgement of the items from the outlets, damage to those items, and also prevent motion of at least one electronic device that may be on the work surface that has a wire coupled to the outlet. For instance, a lamp or a computer wire plugged into an outlet can be prevented from being significantly manipulated due to the work surface contacting the plugs at the outlet, which can prevent the electrical device from being moved along the work surface in an unintended way when a user lowers the work surface 14. For example, because the stop element 5 can stop motion of the work surface from resulting in the work surface contacting a plug coupled to an outlet 7, the work surface 14 will be prevented from providing a force that may act on the plug that could pull the lamp, computer, or other electrical device (e.g. smart phone or tablet) connected to the wiring plugged into the outlet 7 along the work surface (and off the work surface) in an unstable and undesired manner. This function provided by the stop element 5 can also indicate to the user that the work surface needs to have its position corrected to avoid contact with the stop element 5.

The stop element 5 can also be configured to contact a work surface that may be raised into contact with the stop element as well. The stop element 5 can be positioned so that the outer portion of the lower surface of the stop element 5 and/or distal edge 5a contact the work surface 14 if the work surface is attempted to be raised above the stop element 5 when the stop element is positioned over the work surface at its prior height setting. Due to the connection the stop element 5 has to the upper member 4, this contact with the work surface 14 that is being raised can function to stop further raising of the work surface 14 and protect the items connected to the outlet(s) 7. This can avoid dislodgement of the items from the outlets, damage to those items, and also prevent motion of at least one electronic device that may be on the work surface that has a wire coupled to the outlet. It can also indicate to the user that the work surface needs to have its position corrected to avoid contact with the stop element 5.

In some embodiments, one or more fasteners 11 can be utilized to facilitate attachment of the stop element 5 to the upper member 4 without the use of any clips 9. Such an embodiment may best be appreciated from FIGS. 6 and 7. For example, the attachment aperture 5d can be defined so allow at least one fastener 11 to be passed into the attachment aperture 5d and inserted through the inner side 5g of the body 18 of the stop element 5 for attachment within the side groove 4h. The can be an attachment nut 25 having a central opening positionable within the side groove 4h to receive a portion of the fastener 11 for attachment of the fastener to the upper member 4. The nut 25 can be positioned within the side groove 4h, then the fastener can be passed through the nut for attachment of the stop element to the side of the upper member 4 via the side groove 4h. A projection of the fastener 11 that is passed through the nut 25 and the portion of the nut 25 defining its central opening can having mating threads to facilitate attachment of the fastener to the nut 25. An outer peripheral portion of the attachment nut 25 can be sized to contact and engage the inner portions of the upper and lower portions 4b and 4c of the side of the upper member adjacent the groove 4h defined in that side to facilitate attachment of the stop element 5 and positioning of the stop element 5 after the fastener 11 is passed through the nut 25 and sufficiently tightened (e.g. via rotation of the fastener 11 and the mating threads of the nut 25 and fastener 11).

As may best be seen in FIG. 6, the attachment opening 5d for body configuration 19 can be more elongated (e.g. longer) than the attachment opening 5d for body configuration 18a or the body configuration 18b. This greater length and size can be utilized allow the fastener(s) 11 and nut(s) 25 to be positioned and manipulated for attachment of the stop element 5 to the upper member 4 via the side groove 4h.

It should be appreciated that different embodiments can have different structures to meet a particular set of design criteria. For instance, other embodiments can utilize more than two or three legs 3 and some embodiments may not utilize feet 2. The size and shape of each stop element 5 can be a uniform size or can be configured to vary in structure and size for different embodiments. As yet another example, each apparatus 1 can utilize multiple stop elements 5 or a single elongated stop element 5 via each side groove 4h.

Figure 8:
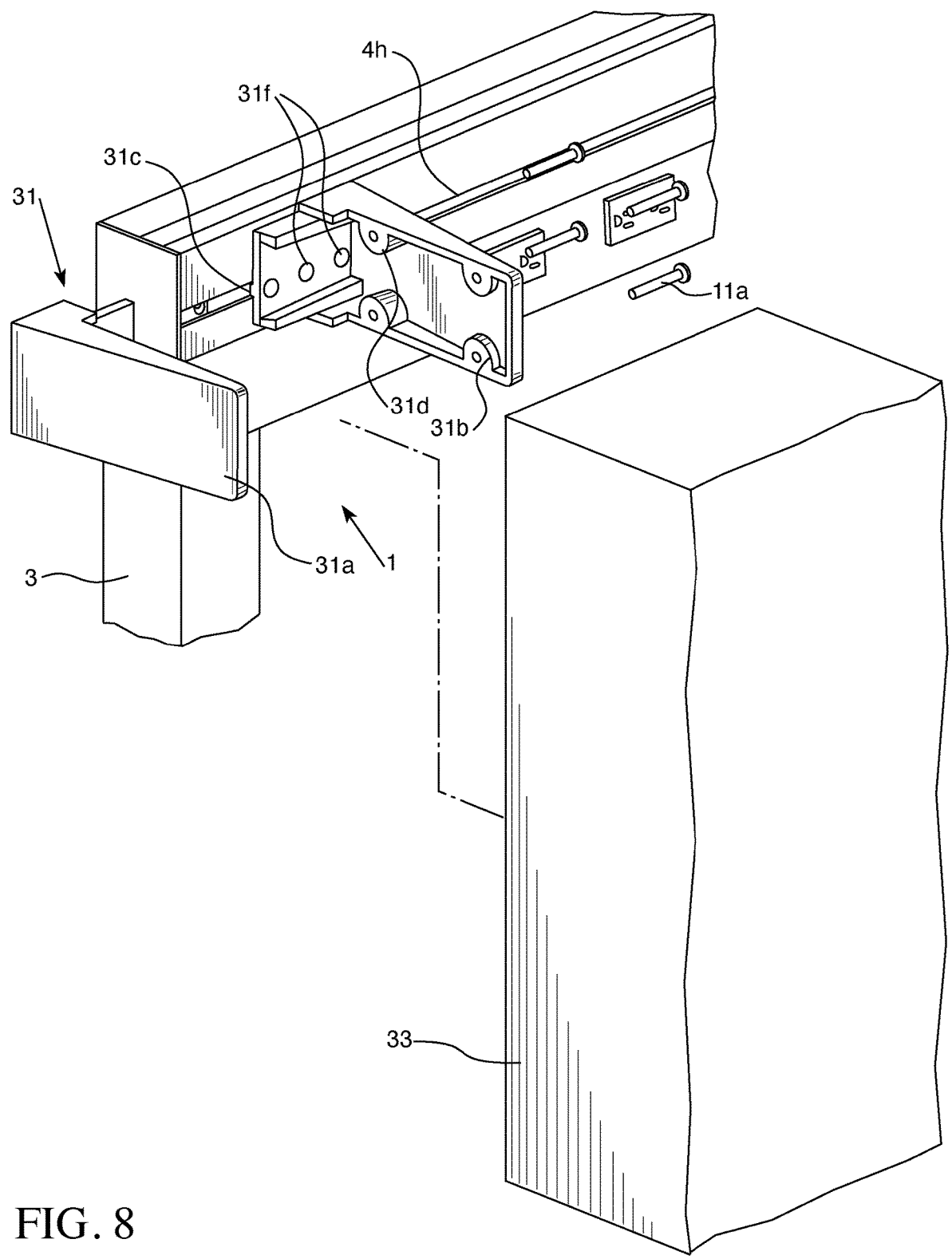
FIG. 8 is fragmentary exploded view of the first exemplary embodiment of an apparatus configured to provide a stop for a height adjustable work surface having a first exemplary embodiment of a privacy screen mounted thereto.
Figure 9:
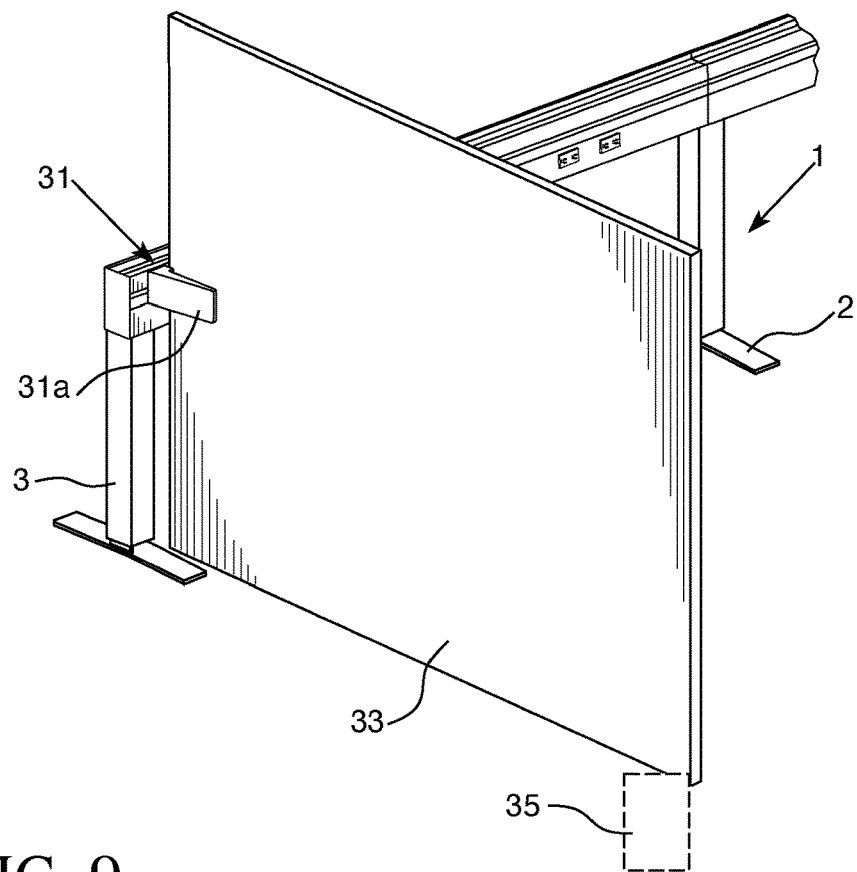
FIG. 9 is a fragmentary view of the first exemplary embodiment of an apparatus configured to provide a stop for a height adjustable work surface having the first exemplary embodiment of a privacy screen mounted thereto.
Figure 10:
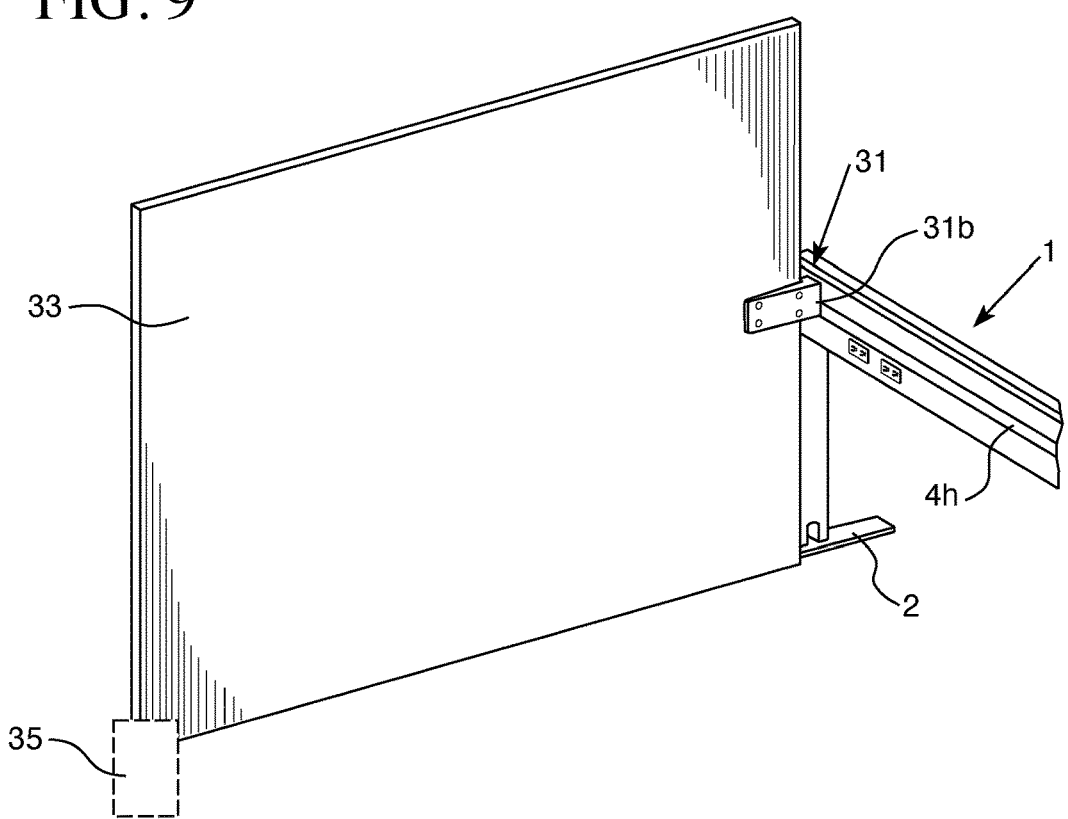
FIG. 10 is a fragmentary view of the first exemplary embodiment of an apparatus configured to provide a stop for a height adjustable work surface having the first exemplary embodiment of a privacy screen mounted thereto.

Referring to FIGS. 8-10, the apparatus 1 can also be configured to help mount other articles for positioning those articles adjacent to a work surface. For example, privacy screen bodies 33 can be attachable to the upper member 4 via side groove 4h near the ends of the upper member. An example of a privacy screen mounting device 31 that can be utilized for mounting a screen body 33 is shown in FIGS. 8-10. An optional distal screen body support 35 is shown schematically in broken line in FIGS. 9 and 10. The distal screen body support 35 can be a leg, a foot, or other support that can be attached to a lower portion of the screen body located away from the upper member 4 to provide additional support for the screen body 33 so the screen body 33 can be maintained in its position when mounted via mounting device 31.

The privacy screen mounting device 31 can include first and second jaw members 31a and 31b. Each jaw member can include a projection 31c that is configured to be inserted within the side groove 4h to help locate the positioning of the mounting device jaw members. Fasteners 11 can be passed through each jaw member to attach each jaw member to the upper member 4. Each jaw member can have a plurality of holes 31d to receive screen body fasteners 11a that can be passed through the holes 31d of the jaw members and through the screen body 33 after the a side portion of the screen body is positioned between the jaw members. The screen body fasteners 11a can attach the screen body to the jaw members for positioning of the screen body 33.

In some embodiments, the end portions of each upper member can have holes 31f defined therein that are in communication with a side groove 4h to facilitate insertion of fasteners 11 for mounting of the jaw members to the upper member. FIG. 8 illustrates an example of such an arrangement of holes 31f in communication with a side groove 4h. These holes 31f can be alignable with holes of attachment nuts 25 or threaded holes defined in the upper member 4 and in communication with the side groove 4h for receipt of the fasteners 11.

In some embodiments of the apparatus 1, the upper member 4 can extend between two spaced apart legs 3. In other embodiments, the upper member 4 can include multiple beam elements that are positioned adjacent to each other. A leg 3 between immediately adjacent ends of the beam elements can be attached to each upper member 4 via their bottom channel 4d to interconnect the beam elements to define the upper member 4. There can be two or more beam elements that are utilized to form an apparatus 1. In other embodiments, an upper member 4 can be a single beam element.

It should be appreciated that a method of providing a stop for the lowering of a work surface can utilize embodiments of the apparatus. For example, the apparatus 1 can be positioned adjacent to and below a work surface 14 in a position that is spaced apart from the work surface. At least one stop element 5 can be attached to the upper member 4 of the apparatus 1 so that the distal edge 5a of the stop element 5 extends away from the upper member 4 and is positioned under the work surface 14. When the work surface 14 is lowered, the stop element can be positioned to contact the work surface 14 to prevent the work surface from being further lowered passed the stop element 5. By preventing the further lowering of the work surface 14, items below the stop element 5, such as plugs or other items, can be protected from being damaged or unplugged from an outlet 7. The use of embodiments of our apparatus configured to provide a stop for a height adjustable work surface 14 can also allow height adjustable work surfaces 14 to be employed in a work area more safely. The apparatus 1 can avoid accidents, avoid unintentional moving of electronic devices on the work surface when the work surface is lowered, and prevent the work surface from engaging plugs or other items below the stop element that could damage those elements and/or unintentionally decouple items from an outlet 7.

The stop function provided by the apparatus 1 can be provided to avoid a tabletop, desktop or other height adjustable work surface from inadvertently contacting one or more objects that may be shrouded or partially covered by a stop element 5 to avoid dislodgement or damage. It is contemplated that the stop element 5 may be positioned such that the apparatus 1 is sufficiently remote from a work surface (e.g. desktop or tabletop) so that the work surface should not contact the stop element 5 when it is raised or lowered in a typical work arrangement layout for a work space (e.g. an office). But, over time of use, the remote work surface may be inadvertently moved so that it can be positioned into contact with the stop element 5 via work surface height adjustment (e.g. table or desk slides or moves on a floor of an office from use over time closer to the apparatus 1, etc.). The stop element 5 can be configured to prevent damage or cord dislodgement in such situations, which can improve the safety of the personnel and also avoid inadvertent power failure issues or data communication issues (e.g. inadvertent computer shutdown that results in lost work documentation, etc.). In such situations, the contact of a works surface with a stop element 5 and resultant noise that can occur from this contact and the stopping of the work surface can also alert a user to the shifted position of the work surface so that the work surface and apparatus 1 can be re-arranged into a more remotely positioned arrangement when such positioning is desired by the user.

It should be understood that other modifications to the apparatus 1 configured to provide a stop for a height adjustable work surface 14 can be made to meet a particular set of design criteria. For example, it is contemplated that a particular feature described, either individually or as part of an embodiment, can be combined with other individually described features, or parts of other embodiments. The elements and acts of the various embodiments described herein can therefore be combined to provide further embodiments. As another example, the size, shape and weight of a screen body 33 can be any size or shape to meet a particular set of design criteria. As yet another example, the type of mounting connector that is utilized in an embodiment for mounting a screen body 33 for a privacy screen for positioning of the privacy screen apparatus adjacent a work surface to provide a visible barrier may be any type of connector structure geometry that may facilitate use of a mounting device to meet a particular set of design criteria. As another example, the size and shape of the legs 3 and upper member 4 can be any of a number of different sizes and shapes to meet a particular set of design criteria and provide a desired ornamental appearance.

Therefore, while certain exemplary embodiments of apparatuses configured to provide a stop for a height adjustable work surface, privacy screen apparatuses, connection mechanisms for privacy screen apparatuses (e.g. screen attachment apparatuses), and methods of making and using the same have been discussed and illustrated herein, it is to be distinctly understood that the invention is not limited thereto but may be otherwise variously embodied and practiced within the scope of the following claims.

What is claimed is:

1. An apparatus configured to provide a stop for a height adjustable work surface comprising:
    an article of furniture having a height adjustable work surface;
    an elongated upper member having a top, a bottom, a first side extending between the top and the bottom and a second side extending between the top and the bottom opposite the first side, the first side having a first side groove, the elongated upper member positionable remote from the work surface;
    a stop element attachable to the upper member via the first side groove so that the stop element extends below the work surface and is spaced apart from the work surface and is remote from the work surface.

2. The apparatus of claim 1, comprising an attachment mechanism that attaches the stop element to the upper member via the first side groove.

3. The apparatus of claim 2, wherein the attachment mechanism comprises a clip that extends from a body of the stop element to a position within the first side groove to engage the upper member within the first side groove.

4. The apparatus of claim 3, wherein the attachment mechanism also comprises at least one fastener passable through an attachment aperture defined in a lower portion of the body of the stop element for attaching an attachment portion of the clip to the body of the stop element.

5. The apparatus of claim 4, wherein the clip includes a distal hook portion and an intermediate portion between the attachment portion and the distal hook portion, the intermediate portion extending through a clip passageway defined in the body of the stop element, the distal hook portion being positioned in the first side groove to engage the upper member within the first side groove.

6. The apparatus of claim 2, wherein the attachment mechanism comprises at least one fastener that is passable through an attachment aperture define in a lower portion of the body of the stop element for attaching the stop element to the upper member.

7. The apparatus of claim 2, comprising:
    at least one electrical outlet attached to the upper member below the first side groove.

8. The apparatus of claim 2, comprising:
    a seat attached to the top of the upper member and/or
    a privacy screen body attached adjacent to a first end of the upper member via a privacy screen mounting device.

9. The apparatus of claim 2, comprising:
    a plurality of legs attached to the upper member to support the upper member on a floor.

10. The apparatus of claim 9, comprising a plurality of feet, each foot attached to a respective one of the plurality of legs.

11. The apparatus of claim 1, wherein the stop element is positioned so that a distal end of the stop element is contactable with the work surface, the work surface being remote from the upper member and being moveable from a first position above the upper member to a second position, the stop element positioned so the distal end contacts the work surface to prevent the work surface from moving below the stop element when the work surface is moved toward the second position.

12. A method of providing a stop for a work surface comprising:
    positioning an apparatus configured to provide a stop for a height adjustable work surface remote from an article of furniture having the work surface so that a stop element of the apparatus is positioned so that a distal end of the stop element is contactable with the work surface so that the stop element prevents the work surface from moving below the stop element; and
    positioning the article of furniture having the work surface adjacent to the apparatus while also being remote from the apparatus such that lowering of the work surface below the stop element is prevented via the distal end of the stop element contacting the work surface so that the stop element prevents the work surface from moving below the stop element.

13. The method of claim 12, wherein the height adjustable work surface is moveable from a first position that is above the stop element to a second position that is below the stop element and the stop element is positioned to prevent the work surface from moving to the second position.

14. The method of claim 13, wherein an attachment mechanism attaches the stop element to an upper member of the apparatus via a first side groove defined in a first side of the upper member.

15. The method of claim 13, comprising:
    lowering the work surface from the first position toward the second position such that the work surface contacts the stop element to stop the work surface before the work surface reaches the second position.

16. The method of claim 15, wherein the attachment mechanism comprises:
    a clip that extends from a body of the stop element to a position within the first side groove to engage the upper member within the first side groove; and
    at least one fastener that is passable through an attachment aperture defined in a lower portion of the body of the stop element for attaching an attachment portion of the clip to the body of the stop element.

17. The method of claim 15, wherein there is at least one electrical outlet attached to the upper member below the first side groove such that the stop element is above the at least one electrical outlet.

* * * * *